United States Patent
Honda et al.

(10) Patent No.: US 7,998,533 B2
(45) Date of Patent: Aug. 16, 2011

(54) HIGHLY CORROSION-RESISTANT HOT-DIP GALVANIZED STEEL PRODUCT EXCELLENT IN SURFACE SMOOTHNESS AND FORMABILITY AND PROCESS FOR PRODUCING SAME

(75) Inventors: Kazuhiko Honda, Kimitsu (JP);
Hidetoshi Hatanaka, Kimitsu (JP);
Hajime Onozawa, Kimitsu (JP)

(73) Assignee: Nippon Steel Corporation, Tokyo (JP)

( * ) Notice: Subject to any disclaimer, the term of this patent is extended or adjusted under 35 U.S.C. 154(b) by 19 days.

(21) Appl. No.: 11/977,908

(22) Filed: Oct. 26, 2007

(65) Prior Publication Data
US 2008/0131729 A1 Jun. 5, 2008

Related U.S. Application Data

(62) Division of application No. 10/532,854, filed as application No. PCT/JP03/13732 on Oct. 27, 2003.

(30) Foreign Application Priority Data

Oct. 28, 2002 (JP) .................. 2002-313065
Apr. 25, 2003 (JP) .................. 2003-121685

(51) Int. Cl.
*B05D 1/18* (2006.01)
(52) U.S. Cl. .......... 427/436; 427/435; 427/430.1; 427/328
(58) Field of Classification Search ............. 427/430.1, 427/431, 433, 435, 436
See application file for complete search history.

(56) References Cited

U.S. PATENT DOCUMENTS

| 6,465,114 | B1 * | 10/2002 | Honda et al. ............. 428/659 |
| 6,709,770 | B2 * | 3/2004 | Komatsu et al. ........... 428/659 |
| 7,238,431 | B2 | 7/2007 | Honda et al. |
| 2003/0113575 | A1 | 6/2003 | McDevitt ................. 428/653 |
| 2004/0258949 | A1 | 12/2004 | Honda et al. |

FOREIGN PATENT DOCUMENTS

| CN | 1211286 A | 3/1999 |
| EP | 0 905 270 | 8/2004 |
| EP | 1 466 994 | 10/2004 |
| EP | 1 489 195 | 12/2004 |

(Continued)

OTHER PUBLICATIONS

Okamoto, H. Ti-Zn (Titanium-Zinc). Journal of Phase Equilibria and Diffusion, vol. 29, No. 2, 2008. pp. 211-212.*

(Continued)

*Primary Examiner* — David Turocy
(74) *Attorney, Agent, or Firm* — Kenyon & Kenyon LLP

(57) ABSTRACT

The present invention provides a highly corrosion-resistant plated steel sheet that can achieve excellent surface smoothness and formability and, according to the process of the present invention, a hot-dip galvanized steel product excellent in surface smoothness and formability having on the steel product surface a zinc alloy plating layer composed of 4 to 22% by mass of Al, 1 to 5% by mass of Mg, 0.000001 to 0.1% by mass of Ti, 0.000001 to 0.5% by mass of Si and the balance of Zn and unavoidable impurities, the plating layer of the plated steel product having a metal structure in which an [$Mg_2Si$ phase], an [Al phase], a [$Zn_2Mg$ phase] and a [Zn phase] are present in a mixture in the matrix of an [Al/Zn/$Zn_2Mg$ ternary eutectic structure], and the plating layer containing a Ti—Al base intermetallic compound in the [Al phase] and/or the [$Zn_2Mg$ phase] and/or the [Zn phase], is produced.

8 Claims, 4 Drawing Sheets

FOREIGN PATENT DOCUMENTS

| | | |
|---|---|---|
| EP | 1 557 478 | 7/2005 |
| JP | 05-125515 | 5/1993 |
| JP | 2000-104154 | 4/2000 |
| JP | 3179446 | 4/2001 |
| JP | 2001-295015 | 10/2001 |
| JP | 2001-355055 | 12/2001 |
| JP | 2002-187234 A | 7/2002 |
| JP | 2002187234 A * | 7/2002 |
| WO | WO 98/26103 A1 | 6/1998 |
| WO | WO 01/27343 | 4/2001 |
| WO | WO 01/59171 A1 | 8/2001 |
| WO | WO 0159171 A1 * | 8/2001 |
| WO | WO 03/060179 | 7/2003 |
| WO | WO 03/076679 | 9/2003 |

OTHER PUBLICATIONS

Edited by The Japan Institute of Metals, 'Kaitei 3 Han Kinzoku Databook', Murezen co., Ltd., Hakko, 1998, p. 598.*

Edited by The Japan Institute of Metals, 'Kaitei 3 Han Kinzoku Databook', Maruzen Co., Ltd., Hakko, 1993, p. 598, Figs. 3 625.

JP 2002-187234 English Machine Translation, Fumishiro et al., Jul. 2002.

Mexican Office Action dated Oct. 27, 2009 issued in corresponding Mexican Application.

European Search Report dated May 9, 2011, issued in corresponding European Application No. 03 75 8954.

* cited by examiner

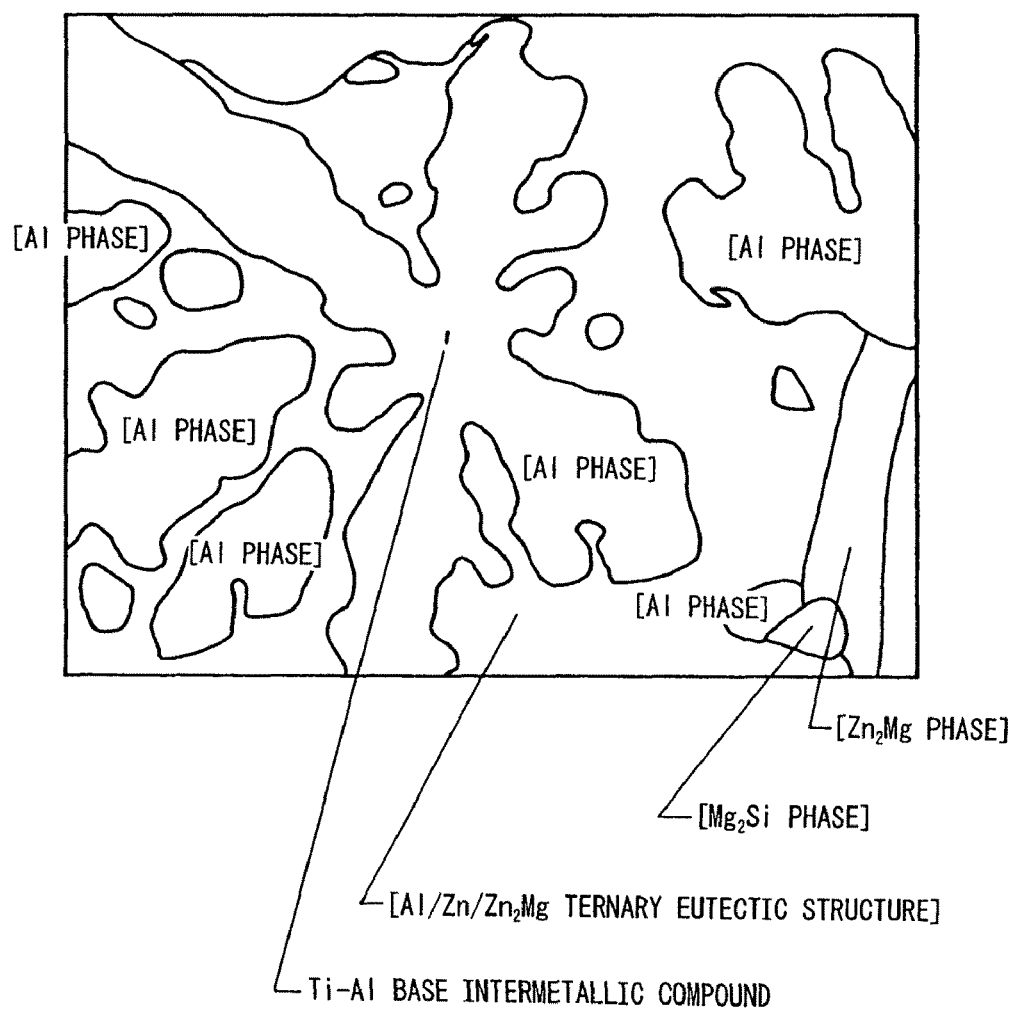

HIGHLY CORROSION-RESISTANT HOT-DIP GALVANIZED STEEL PRODUCT EXCELLENT IN SURFACE SMOOTHNESS AND FORMABILITY AND PROCESS FOR PRODUCING SAME

This application is a divisional application under 35 U.S.C. §120 and §121 of co-pending U.S. application Ser. No. 10/532,854 filed Apr. 27, 2005, which is a 35 U.S.C. §371 of International Application No. PCT/JP2003/13732 filed Oct. 27, 2003, wherein PCT/JP2003/13732 was filed and published in the Japanese language.

FIELD OF THE INVENTION

The present invention relates to a plated steel sheet and, in more detail, to a highly corrosion-resistant plated steel product that can be applied to various applications and, for example, to household electrical appliances, automobiles and steel sheets for building materials.

BACKGROUND ART

There are zinc base plated steel sheets that are often used as plated steel products excellent in corrosion resistance. The plated steel sheets are used in various manufacturing industries such as the automobile, household electrical appliance and building material industries. Moreover, plated steel products are used in various other fields such as the plated steel wire and hot-dip galvanized steel product fields.

In order to improve the corrosion resistance of such zinc base plated steel products, the present inventors have proposed a hot-dip Zn—Al—Mg—Si coated steel sheet (see, e.g., Japanese Patent Publication No. 3,179,446).

Furthermore, in order to improve the corrosion resistance of zinc base plated steel products, a zinc base plated steel sheet that is made excellent in age-based darkening resistance by adding Ti to the hot-dip Zn—Al coated steel sheet has been proposed (see, e.g., Japanese Unexamined Patent Publication (Kokai) No. 5-125515). However, the problem that the resultant plated steel sheet shows poor surface smoothness and formability was not taken into consideration.

Still furthermore, a zinc-base plated-steel sheet, the appearance of which is made good by adding Ti, B and Si to a hot-dip Zn—Al—Mg coated steel sheet, has been proposed (e.g., see Japanese Unexamined Patent Publication (Kokai) No. 2001-295015). Although Ti and B are added for the purpose of inhibiting the formation and growth of a $Zn_{11}Mg_2$ phase that makes the appearance of the plated steel sheet poor, the proposal neither considers the problem that the addition makes the surface smoothness and formability of the plated steel sheet poor, nor refers to formation of an intermetallic compound.

However, the surface smoothness and formability are not ensured sufficiently for the above plated steel sheets and other disclosed plated sheets.

When the solidification rate of the plating layer is adequately ensured during hot-dip galvanizing, the plating layer solidifies before the Al phase grows significantly. As a result, a problem of the surface smoothness does not arise. However, when the solidification rate of the plating layer is small, the Al phases significantly grow first. Protrusions and recesses are then formed on the plating layer surface, and the resultant plated steel sheet has the problem that the surface smoothness and formability become poor.

DISCLOSURE OF THE INVENTION

An object of the present invention is to solve the above problems, and provide highly corrosion-resistant plated steel products.

As a result of intensively carrying out investigations on the development of a plated steel sheet excellent in surface smoothness and formability, the present inventors have discovered that the surface smoothness and formability can be improved by making the plating layer have a metal structure in which one or at least two of the [$Mg_2Si$ phase], [Al phase], [$Zn_2Mg$ phase] and [Zn phase] are present in a mixture in the matrix of an [Al/Zn/$Zn_2Mg$ ternary eutectic structure], and making one or at least two of the [Al phase], [$Zn_2Mg$ phase] and [Zn phase] contain a Ti—Al base intermetallic compound, and they have thus achieved the present invention. The aspects of the present invention are as described below.

(1) A highly corrosion-resistant hot-dip galvanized steel product excellent in surface smoothness and formability, having on the steel product surface a zinc alloy plating layer composed of 4 to 10% by mass of Al, 1 to 5% by mass of Mg, up to 0.1% by mass of Ti and the balance of Zn and unavoidable impurities, the plating layer having a metal structure in which one or at least two of the [Al phase], [$Zn_2Mg$ phase] and [Zn phase] are present in a mixture in the matrix of an [Al/Zn/$Zn_2Mg$ ternary eutectic structure], and the plating layer containing a Ti—Al base intermetallic compound in one or at least two of the [Al phase], [$Zn_2Mg$ phase] and [Zn phase].

(2) A highly corrosion-resistant hot-dip galvanized steel product excellent in surface smoothness and formability, having on the steel product surface a zinc alloy plating layer composed of 4 to 22% by mass of Al, 1 to 5% by mass of Mg, up to 0.1% by mass of Ti, up to 0.5% by mass of Si and the balance of Zn and unavoidable impurities, the plating layer of the plated steel product having a metal structure in which an [$Mg_2Si$ phase], an [Al phase] and a [$Zn_2Mg$ phase] are present in a mixture in the matrix of an [Al/Zn/$Zn_2Mg$ ternary eutectic structure], and the plating layer containing a Ti—Al base intermetallic compound in one or at least two of the [Al phase] and the [$Zn_2Mg$ phase].

(3) A highly corrosion-resistant hot-dip galvanized steel product excellent in surface smoothness and formability, having on the steel product surface a zinc alloy plating layer composed of 4 to 22% by mass of Al, 1 to 5% by mass of Mg, up to 0.1% by mass of Ti, up to 0.5% by mass of Si and the balance of Zn and unavoidable impurities, the plating layer of the plated steel product having a metal structure in which an [$Mg_2Si$ phase], an [Al phase], a [$Zn_2Mg$ phase] and a [Zn phase] are present in a mixture in the matrix of an [Al/Zn/$Zn_2Mg$ ternary eutectic structure], and the plating layer containing a Ti—Al base intermetallic compound in one or at least two of the [Al phase], [$Zn_2Mg$ phase] and [Zn phase].

(4) A highly corrosion-resistant hot-dip galvanized steel product excellent in surface smoothness and formability having, on the steel product surface, a zinc alloy plating layer composed of 4 to 22% by mass of Al, 1 to 5% by mass of Mg, up to 0.1% by mass of Ti, up to 0.5% by mass of Si and the balance of Zn and unavoidable impurities, the plating layer of the plated steel product having a metal structure in which an [$Mg_2Si$ phase], an [Al phase] and a [Zn phase] are present in a mixture in the matrix of an [Al/Zn/$Zn_2Mg$ ternary eutectic structure], and the plating layer containing a Ti—Al base intermetallic compound in one or two of the [Al phase] and [Zn phase].

(5) A highly corrosion-resistant hot-dip galvanized steel product excellent in surface smoothness and formability, wherein the Ti—Al base intermetallic compound according to any one of (1) to (4) mentioned above is $TiAl_3$.

(6) A highly corrosion-resistant hot-dip galvanized steel product excellent in surface smoothness and formability, wherein the Ti—Al base intermetallic compound according to any one of (1) to (4) mentioned above is $Ti(Al_{1-x}Si_x)_3$ (wherein X=0 to 0.5).

(7) The highly corrosion-resistant hot-dip galvanized steel product excellent in surface smoothness and formability according to any one of (1) to (6) mentioned above, wherein the Ti—Al base intermetallic compound contained in an [Al phase] in the plating layer is present in a Zn—Al eutectoid reaction structure in which Zn phases are condensed.

(8) The highly corrosion-resistant hot-dip galvanized steel product excellent in surface smoothness and formability according to any one of (1) to (7) mentioned above, wherein the size of a dendrite in an [Al phase] in the plating layer is up to 500 μm.

(9) A process for producing the highly corrosion-resistant hot-dip galvanized steel product excellent in surface smoothness and formability according to any one of (1) to (8) mentioned above, comprising the step of adding a Ti—Zn base intermetallic compound to a plating bath.

BEST MODE FOR CARRYING OUT THE INVENTION

Figure 1A:
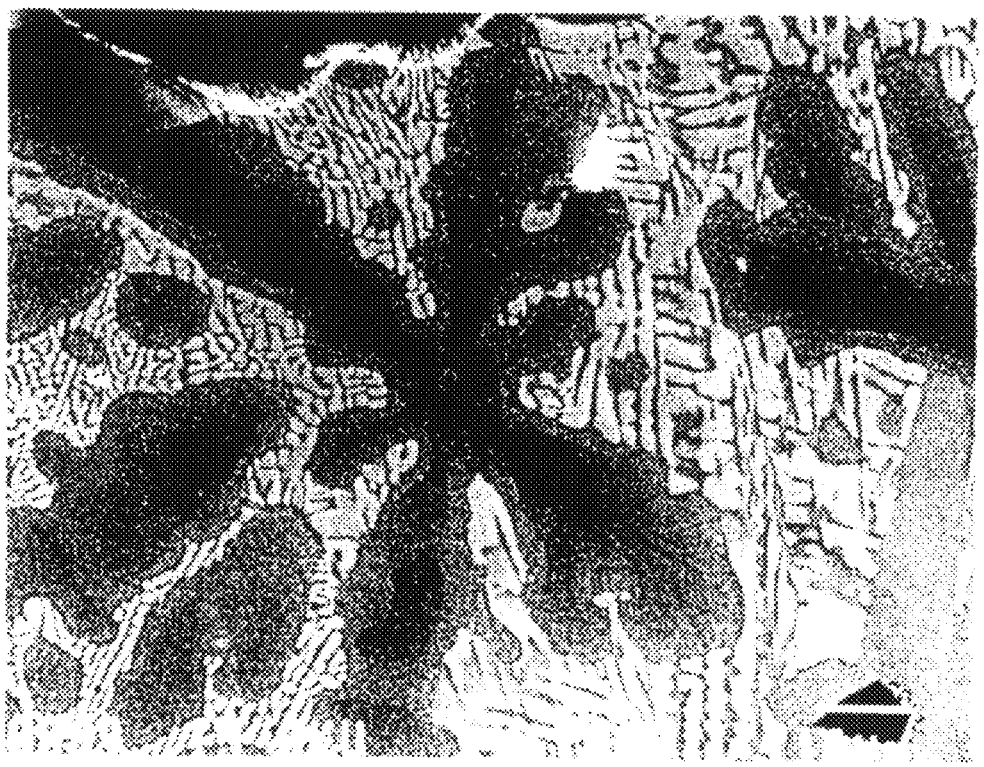
FIG. 1 (a) is a photomicrograph substituted for drawing (magnification: 1,000×) of a plating layer of the plated steel product of the present invention, and FIG. 1 (b) is a view showing the distribution state of each structure in the photomicrograph.

The hot-dip galvanized steel product according to the present invention is a plated steel sheet having either a plating layer composed of 4 to 10% by mass of Al, 1 to 5% by mass of Mg, up to 0.1% by mass of Ti and the balance of Zn and unavoidable impurities, or a plating layer composed of 4 to 22% by mass of Al, 1 to 5% by mass of Mg, up to 0.1% by mass of Ti, up to 0.5% by mass of Si and the balance of Zn and unavoidable impurities, the plating layer of the plated steel sheet having a metal structure in which one or at least two of the [$Mg_2Si$ phase], [Al phase], [$Zn_2Mg$ phase] and [Zn phase] are present in a mixture in the matrix of an [Al/Zn/$Zn_2Mg$ ternary eutectic structure], and the plating layer containing a Ti—Al base intermetallic compound in one or at least two of the [Al phase], [$Zn_2Mg$ phase] and [Zn phase].

The Al content in the Zn—Al—Mg—Ti base plating layer is restricted to 4 to 10% by mass for the following reasons. When the Al content exceeds 10% by mass, the adhesion of the plating layer decreases. The Al content in the plating layer to which Si is not added must therefore be made 10% by mass or less. Moreover, when the Al content is less than 4% by mass, no Al phase crystallizes as primary crystals, and the problem of lowering of smoothness does not arise.

Accordingly, in the hot-dip galvanized steel product of the invention, it is essential to add Si to the plating layer to ensure adhesion of the plating layer particularly when the Al concentration is as high as greater than 10% by mass.

On the other hand, the Al content in the Zn—Al—Mg—Ti—Si base plating layer is restricted to 4 to 22% by mass for the following reasons. When the Al content is less than 4% by mass, no problem about lowering of smoothness arises because no Al phase crystallizes as primary crystals. When the Al content exceeds 22% by mass, the effect of improving the corrosion resistance is saturated.

The Si content is restricted to 0.5% by mass or less (Si content of 0% by mass being excluded) for the following reasons: although Si has the effect of improving the adhesion, the effect is saturated when the content exceeds 0.5% by mass. The Si content is desirably from 0.00001 to 0.5% by mass, and more desirably from 0.0001 to 0.5% by mass.

Addition of Si to a plating layer having an Al content exceeding 10% by mass is essential. However, even for a plating layer having an Al content of up to 10%, because the effect of improving the adhesion of the plating layer is also significant, addition of Si to the plating layer of a steel product is effective when the steel product is required to have high adhesion of the plating layer, for example, when the steel product is used as a member to be severely worked. Moreover, as a result of adding Si, a [$Mg_2Si$ phase] crystallizes in the solidification structure of the plating layer. Because the [$Mg_2Si$ phase] has the effect of improving the corrosion resistance of a worked portion, it is more desirable to increase an addition amount of Si so that a metal structure in which the [$Mg_2Si$ phase] is present in a mixture in the solidification structure of the plating layer is formed.

The Mg content is restricted to 1 to 5% by mass for the following reasons: when the Mg content is less than 1% by mass, the effect of improving the corrosion resistance is inadequate; when it exceeds 5% by mass, the plating layer is embrittled, and the adhesion thereof decreases.

The Ti content is restricted to 0.1% by mass or less (Ti content of 0% by mass being excluded) for the following reasons. Ti has the effect of crystallizing a Ti—Al base intermetallic compound and improving the surface smoothness and formability. However, when the Ti content exceeds 0.1% by mass, the steel product after plating has a rough surface, and it has a poor appearance. Moreover, when the Ti content exceeds 0.1% by mass, a Ti—Al base intermetallic compound is condensed in the plating layer surface to decrease the surface smoothness and formability. The Ti content is desirably from 0.00001 to 0.1% by mass. The Ti content is more desirably from at least 0.00001% by mass to less than 0.01% by mass.

For the plated steel product according to the present invention, a metal structure containing at least one of the [Zn phase], [Al phase], [$Zn_2Mg$ phase], [$Mg_2Si$ phase] and a Ti—Al base intermetallic compound is formed in the matrix of an [Al/Zn/$Zn_2Mg$ ternary eutectic structure] in the plating layer.

The [Al/Zn/$Zn_2Mg$ ternary eutectic structure] herein is a ternary eutectic structure of an Al phase, a Zn phase and an intermetallic compound $Zn_2Mg$ phase. The Al phase forming the ternary eutectic structure corresponds, for example, to an [Al" phase] (Al solid solution dissolving a Zn phase, and containing a small amount of Mg) at high temperature in an Al—Zn—Mg ternary equilibrium state diagram. The Al" phase at high temperature usually appears at room temperature as a fine Al phase and a fine Zn phase in separation. Moreover, the Zn phase in the ternary eutectic structure dissolves a small amount of Al, and further dissolves in some cases a small amount of Mg (Zn solid solution). The $Zn_2Mg$ phase in the ternary eutectic structure is an intermetallic compound phase present near a Zn content of about 84% by weight in a Zn—Mg binary equilibrium state diagram. As long as the state diagram is observed, it is thought that Si and Ti form no solid solution with each phase, or extremely small amounts of Si and Ti form a solid solution therewith even when a solid solution is formed. Because the amounts cannot be definitely distinguished by conventional analysis, the ternary eutectic structure composed of the three phases is represented by an [Al/Zn/Zn$_2$Mg ternary eutectic structure].

Furthermore, the [Al phase] is a phase that appears to be an island having a distinct boundary in the matrix of the above ternary eutectic structure. The phase corresponds, for example, to an [Al" phase] (Al solid solution dissolving a Zn phase, and containing a small amount of Mg) at high temperature in the Al—Zn—Mg ternary equilibrium state diagram. The Al" phase at high temperature dissolves Zn and Mg with the amounts differing and depending on the concentrations of Al and Mg in the plating bath. The Al" phase at high temperature usually separates into a fine Al phase and a fine Zn phase at room temperature. An island-like shape observed at room temperature may be taken as ruins of the Al" phase at high temperature. As long as the state diagram is observed, it is thought that Si and Ti do not form a solid solution with the phase, or the amounts are extremely small even when they form a solid solution therewith. However, because conventional analysis cannot definitely determine the amounts, the phase derived from the Al" phase at high temperature and having the ruins of the shape of the Al" phase is termed an [Al phase] in the present invention. The [Al phase] can be definitely distinguished from the Al phase forming the above ternary eutectic structure by microscopic observation.

Furthermore, the [Zn phase] is a phase that appears to be an island having a distinct boundary in the matrix of the above ternary eutectic structure. Actually, the [Zn phase] sometimes dissolves a small amount of Al and further dissolves a small amount of Mg. As far as the state diagram is observed, it is thought that Si and Ti form no solid solution with the phase, or that the amounts are extremely small even when they form a solid solution therewith. In a microscopic observation, the [Zn phase] can be definitely distinguished from the Zn phase forming the above ternary eutectic structure.

Moreover, the [Zn$_2$Mg phase] is a phase that appears to be an island having distinct boundary in the matrix of the above ternary eutectic structure, and actually dissolves a small amount of Al, sometimes. As far as the state diagram is observed, it is thought that Si and Ti form no solid solution with the phase, or that the amounts of Si and Ti are extremely small even when they form a solid solution therewith. In a microscopic observation, the [Zn$_2$Mg phase] can be clearly distinguished from the Zn$_2$Mg phase forming the above ternary eutectic structure.

Furthermore, the [Mg$_2$Si phase] is a phase that appears to be an island having a distinct boundary in the solidified structure of the plating layer. As far as the state diagram is observed, it is thought that Zn, Al and Ti form no solid solution with the phase, or that even when they form a solid solution therewith, the amounts are extremely small. In a microscopic observation of the plating layer, the [Mg$_2$Si phase] can be clearly distinguished.

Furthermore, the Ti—Al base intermetallic compound is a phase that appears to be an island having a distinct boundary in the solidified structure of the plating layer. As far as the state diagram is observed, the intermetallic compound is thought to be TiAl$_3$. However, because Si is observed when the Ti—Al base intermetallic compound is analyzed in the plating layer to which Si is added, it is thought that the Ti—Al base intermetallic compound in the plating layer is TiAl$_3$ that dissolves Si or Ti(Al$_{1-x}$Si$_x$)$_3$ (X=0 to 0.5) in which Si is substituted for part of Al.

The Ti—Al base intermetallic compound in the hot-dip galvanized steel product of the present invention is characterized in that the intermetallic compound is present in the [Al phase], [Zn$_2$Mg phase] and [Zn phase]. The contained form of the Ti—Al base intermetallic compound is restricted to sites in the [Al phase], [Zn$_2$Mg phase] and [Zn phase] because a Ti—Al base intermetallic compound present in sites other than the above sites cannot improve the surface smoothness and formability. The Ti—Al base intermetallic compound present in sites in the [Al phase], [Zn$_2$Mg phase] and [Zn phase] is thought to improve the surface smoothness and formability for the following reasons: the Ti—Al base intermetallic compound becomes nuclei of the [Al phase], [Zn$_2$Mg phase] and [Zn phase], promotes crystallization of these crystals, and many fine structures are formed. That is, when the crystals become fine, the recesses and protrusions of the plating layer surface are suppressed. As a result, the surface becomes smooth, and the friction coefficient is decreased during forming due to a decrease in the deformation resistance of the plating layer. It is thought that the formability of the plated steel product is thus improved.

The effect is significant particularly in the [Al phase]. The plating layer surface is smoothed and the friction coefficient is lowered by adjusting the size of a dendrite of the [Al phase] to 500 μm or less. The size is desirably up to 400 μm, and more desirably up to 300 μm.

As a result of examining metal structures in many plating layers, they have observed intermetallic compounds each having a size of several micrometers in most of the metal structures. FIG. 1 shows one example of the intermetallic compounds present in an [Al phase]. FIG. 1 (a) is a photomicrograph (magnification: 1,000×) of a plating layer of a plated steel product in the present invention. FIG. 1 (b) is a view showing the distribution state of each structure in the photomicrograph. It is understood from the view that each structure can be definitely specified with the help of a photomicrograph of the plating layer of a plated steel product in the present invention.

In FIG. 1 (a), a Ti—Al base intermetallic compound is observed in a phase corresponding to an [Al" phase] at high temperature in the Al—Zn—Mg ternary equilibrium state diagram. The Al" phase at high temperature usually appears at room temperature as a fine Al phase and a fine Zn phase in separation by a eutectoid reaction taking place at 277° C. in the Al—Zn binary equilibrium state diagram. When a hypoeutectoid reaction takes place herein, the Al" phase crystallized at high temperature starts to precipitate a Zn phase from a ternary eutectic temperature in the Al—Zn—Mg ternary equilibrium state diagram, and the remaining Al" phase forms a eutectoid structure of a fine Al phase and a fine Zn phase at temperature corresponding to the eutectoid reaction in the Al—Zn binary equilibrium state diagram.

Figure 2A:
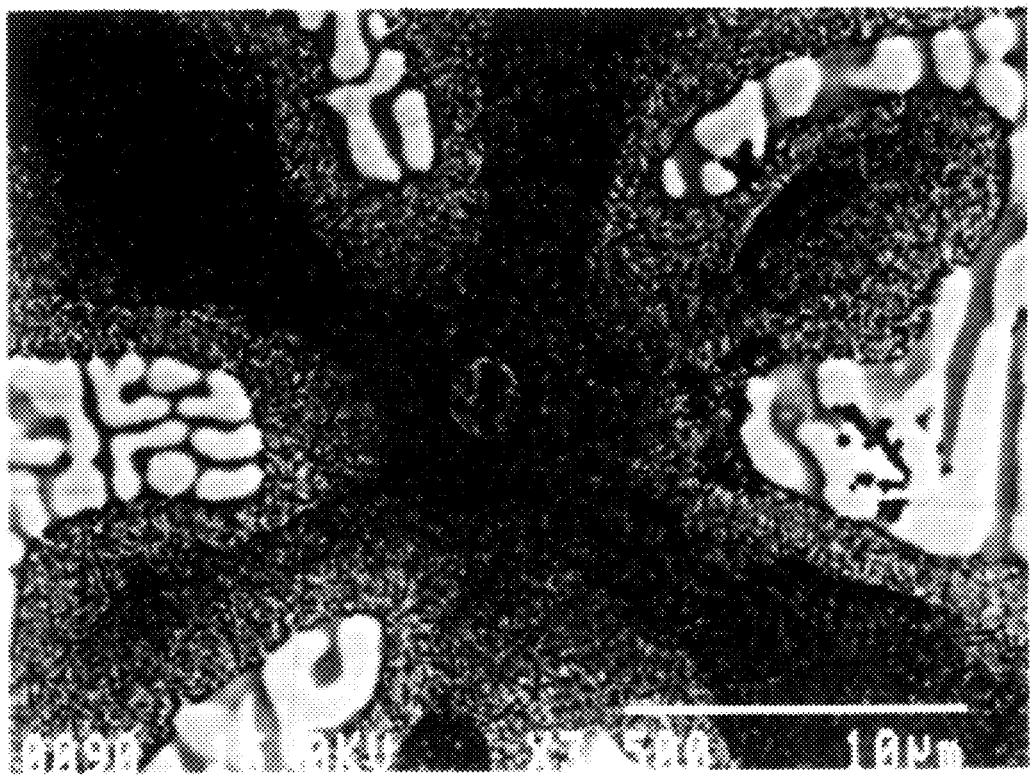
FIG. 2 (a) is a photomicrograph substituted for drawing (magnification: 3,500×) that enlarges the [Al" phase] in FIG. 1, and FIG. 2 (b) is a view showing the distribution state of each structure in the photomicrograph.
Figure 2B:
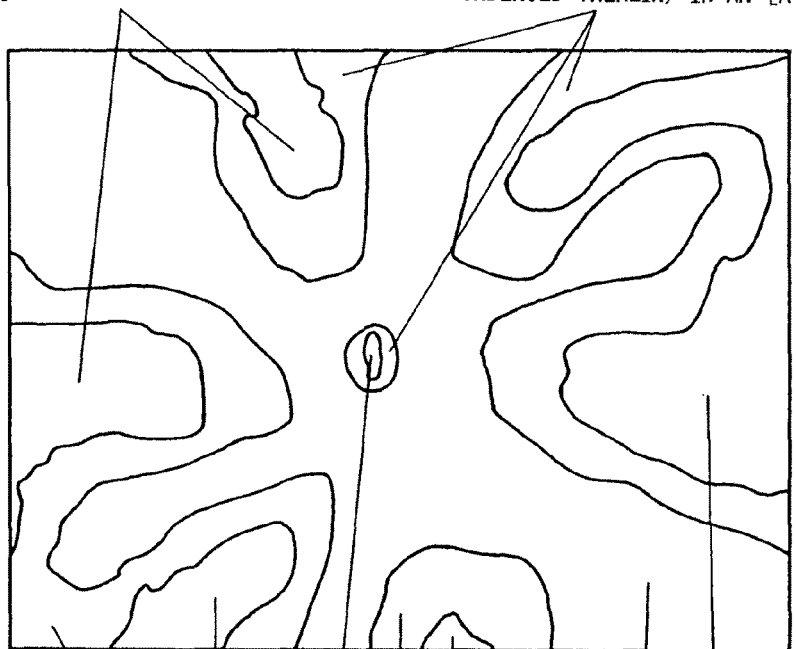

FIG. 2 (a) is a photomicrograph (magnification: 3,500×) that enlarges the Al" phase in FIG. 1. FIG. 2 (b) is a view showing the distribution state of each structure in the photomicrograph. It can be concluded from the observation in detail of the Al" phase that eutectoid structures that are condensed precipitated Zn phases are present outside the Al" phase and around the Ti—Al base intermetallic compound.

Although there is no specific restriction on the size of the intermetallic compound in the present invention, the size observed by the present inventors is up to 10 μm. Moreover, there is no specific limitation on the proportion of the intermetallic compound present in the plating layer structure. However, it is desirable that the intermetallic compound be present in an amount of at least 10% in one of the [Al phase], [Zn$_2$Mg phase] and [Zn phase].

There is no specific restriction on the method of adding the intermetallic compound. A method of dispersing fine powder of the intermetallic compound in the bath, a method of dissolving the intermetallic compound in the bath, and the like method, can be applied. When the plated steel product is produced in a continuous line in which hot-dip galvanizing with a nonoxidizing furnace system is used, a method of dissolving Ti in the plating bath is suitable. As the method of dissolving Ti in a plating bath, a method of adding a Ti—Zn base intermetallic compound is efficient because Ti can be dissolved at low temperature in a short period of time. Examples of the Ti—Zn base intermetallic compound to be added include $Zn_{15}Ti$, $Zn_{10}Ti$, $Zn_5Ti$, $Zn_3Ti$, $Zn_2Ti$ and ZnTi. When such an intermetallic compound is added to the plating bath singly or in a mixture of the intermetallic compound and Zn, or an alloy of Zn—Al or Zn—Al—Mg, dissolved Ti crystallizes in the plating layer as a Ti—Al base intermetallic compound, and the compound improves the surface smoothness and formability.

Examples of the substrate steel product of the present invention include not only steel sheets but also various steel products such as wire rods, shape steels, bar steels and steel tubes. Usable steel sheets include both hot rolled steel sheets and cold rolled steel sheets. Various steel types such as Al-killed steels, extra low carbon steels containing Ti, Nb, etc., high-strength steels containing strengthening elements such as P, Si and Mn and stainless steels can be used.

There is no specific restriction on the production process of the steel products in the invention, and various processes such as continuous plating of steel sheets, and hot-dip galvanizing of steel products and wire rods can be applied. When steel products are to be pre-plated with Ni as a substrate layer, a conventional pre-plating process may be applied. Because the plated products obtained in the present invention each have a plating layer excellent in surface smoothness even when the cooling rate is small, the process shows a significant effect in hot-dip galvanizing in which the plated products are hardly cooled at a large cooling rate, and hot-dip galvanizing of thick steel products.

Although there is no specific limitation on the adhesion amount of the plating layer, the amount is desirably at least 10 $g/m^2$ in view of the corrosion resistance, and up to 350 $g/m^2$ in view of the workability.

The zinc plating layer may also contain Fe, Sb, Pb and Sn singly or in a mixture in an amount of 0.5% by mass or less in addition to the above elements. Moreover, even when the plating layer contains Ca, Be, Cu, Ni, Co, Cr, Mn, P, B, Nb, Bi and group III elements in a total amount of 0.5% by mass or less, the effect of the invention is not impaired, and the corrosion resistance of the plated steel products is sometimes further preferably improved, depending on the amount.

EXAMPLES

Example 1

First, cold rolled steel sheets 0.85 mm thick were prepared. Each steel sheet was hot-dip galvanized for 3 sec in a plating bath at temperature of 400 to 600° C. Amounts of addition elements in the bath were varied. The adhesion amount of a plating layer on one side of each steel sheet was adjusted to 140 $g/m^2$ by $N_2$ wiping, and the plated steel sheet was cooled at a rate of 10° C./sec or less. Table 1 shows the plating compositions of the plated steel sheets thus obtained. The cross section of each steel sheet was observed with a SEM, and Table 1 also shows the results of observing the metal structure of the plating layer.

Each plated steel sheet was inclined at an angle of 10° to the horizontal plane, and surface ground. Ti—Al base intermetallic compounds present in an [Al phase], a [$Zn_2Mg$ phase] and a [Zn phase] were subsequently observed with an EPMA.

The size of dendrites in [Al phases] in the plating layer was determined by the following procedure. The surface of each plated steel sheet was mapped by CMA, and major axes of dendrites in the Al map thus obtained were measured in an area of 5×5 cm. The major axes of five dendrites were measured in order of decreasing magnitude. The average was used as the size of dendrites in the [Al phases].

As to the smoothness, $R_a$ and $W_{CA}$ were measured with a surface roughness shape measurement apparatus (manufactured by Tokyo Seimitsu Co., Ltd.). The surface roughness of each steel sheet (only solidified by cooling) was measured at optional 3 sites under the conditions explained below, and the average was used.

Measurement probe: stylus tip having a curvature of 5 μm R

Measurement length: 25 mm

Cut off: $R_a$ 0.8 mm, $W_{CA}$ 0.8 to 8 mm

Driving speed: 0.3 mm/sec

Filter: 2 CR filter

The smoothness of each steel sheet was judged from the following scores. A steel sheet having a score of 4 was accepted.

4: $R_a$ up to 1 μm, $W_{CA}$ up to 1 μm

3: $R_a$ exceeding 1 μm, $W_{CA}$ up to 1 μm

2: $R_a$ up to 1 μm, $W_{CA}$ exceeding 1 μm

1: $R_a$ exceeding 1 μm, $W_{CA}$ exceeding 1 μm

The formability of each steel sheet was evaluated by a draw bead test. A drawing load obtained under the following measurement conditions was used, and the apparent friction coefficient was calculated.

Bead mold: round shape of a projected portion R 4 mm R, shoulder R 2 mm R

Sample size: 30 mm×300 mm

Slide length: 110 mm

Drawing speed: 200 mm/min

Pressing load: 600, 800, 1,000 kgf

The smoothness of each steel sheet was judged from the following scores. A steel sheet having a score of 3 was accepted.

3: less than 0.20

2: at least 0.20 to less than 0.21

1: at least 0.21

Each steel sheet was sprayed with 5% salt water at 35° C. for 1,000 hours. When rust was not formed, the steel sheet was accepted. When rust was formed, the steel sheet was rejected.

Table 1 shows the evaluation results. Because Sample No. 14 contained no Ti—Al base intermetallic compound, an Al phase grew, and it was rejected because of the smoothness and formability. Because Sample No. 15 had an excessive Ti content, a Ti—Al base intermetallic compound condensed in the surface, and it was rejected because of the smoothness and formability. Because Sample No. 16 had contents of Mg, Al, Si and Ti outside the scope of the present invention, it was rejected because of the corrosion resistance. Samples other than the above ones each showed good smoothness, formability and corrosion resistance.

TABLE 1

| Sample No. | Composition of hot-dip Zn coating layer (mass %) | | | | Metal structure | | | | | |
|---|---|---|---|---|---|---|---|---|---|---|
| | Mg | Al | Si | Ti | Mg$_2$Si phase | Ternary eutectic | Al phase | Zn phase | MgZn$_2$ phase | Ti—Al base intermetallic cpd. |
| 1 | 4 | 8 | 0.15 | 0.009 | ○ | ○ | ○ | ○ | ○ | ○ |
| 2 | 5 | 10 | 0.2 | 0.009 | ○ | ○ | ○ | | ○ | ○ |
| 3 | 5 | 15 | 0.45 | 0.009 | ○ | ○ | ○ | | ○ | ○ |
| 4 | 3 | 6 | 0.05 | 0.009 | ○ | ○ | ○ | ○ | | ○ |
| 5 | 1 | 19 | 0.5 | 0.009 | ○ | ○ | ○ | | ○ | ○ |
| 6 | 1 | 4 | 0.005 | 0.009 | ○ | ○ | ○ | ○ | | ○ |
| 7 | 3 | 11 | 0.2 | 0.009 | ○ | ○ | ○ | | ○ | ○ |
| 8 | 3 | 11 | 0.2 | 0.001 | ○ | ○ | ○ | | ○ | ○ |
| 9 | 3 | 11 | 0.2 | 0.0002 | ○ | ○ | ○ | | ○ | ○ |
| 10 | 3 | 11 | 0.2 | 0.00005 | ○ | ○ | ○ | | ○ | ○ |
| 11 | 3 | 11 | 0.2 | 0.000001 | ○ | ○ | ○ | | ○ | ○ |
| 12 | 3 | 11 | 0.0002 | 0.009 | ○ | ○ | ○ | | ○ | ○ |
| 13 | 3 | 11 | 0.000001 | 0.009 | ○ | ○ | ○ | | ○ | ○ |
| 14 | 3 | 11 | 0.2 | 0 | ○ | ○ | ○ | | ○ | |
| 15 | 3 | 11 | 0.2 | 0.12 | ○ | ○ | ○ | | ○ | ○ |
| 16 | 0 | 0.2 | 0 | 0 | | | | ○ | | |
| 17 | 3 | 6 | 0 | 0.01 | | ○ | ○ | ○ | ○ | ○ |

| Sample No. | Size of Al phase | Smoothness | Formability | Corrosion resistance | Note |
|---|---|---|---|---|---|
| 1 | 150 μm | 4 | 3 | Accepted | Ex. |
| 2 | 150 μm | 4 | 3 | Accepted | Ex. |
| 3 | 150 μm | 4 | 3 | Accepted | Ex. |
| 4 | 100 μm | 4 | 3 | Accepted | Ex. |
| 5 | 200 μm | 4 | 3 | Accepted | Ex. |
| 6 | 100 μm | 4 | 3 | Accepted | Ex. |
| 7 | 150 μm | 4 | 3 | Accepted | Ex. |
| 8 | 200 μm | 4 | 3 | Accepted | Ex. |
| 9 | 300 μm | 4 | 3 | Accepted | Ex. |
| 10 | 350 μm | 4 | 3 | Accepted | Ex. |
| 11 | 450 μm | 4 | 3 | Accepted | Ex. |
| 12 | 150 μm | 4 | 3 | Accepted | Ex. |
| 13 | 150 μm | 4 | 3 | Accepted | Ex. |
| 14 | 1200 μm | 2 | 2 | Accepted | Comp. Ex. |
| 15 | 200 μm | 3 | 2 | Accepted | Comp. Ex. |
| 16 | — | 4 | 3 | Rejected | Comp. Ex. |
| 17 | 150 μm | 4 | 3 | Accepted | Ex. |

Example 2

First, cold rolled steel sheets 0.85 mm thick were prepared. Each steel sheet was hot-dip galvanized for 3 sec in a plating bath at a temperature of 520° C. Amounts of addition elements in the bath were varied. The adhesion amount of a plating layer on one side of each steel sheet was adjusted to 140 g/m$^2$ by N$_2$ wiping, and the plated steel sheet was cooled at a rate of 10° C./sec or less. Table 2 shows the plating compositions of the plated steel sheets thus obtained. The cross section of each steel sheet was observed with a SEM, and Table 2 also shows the results of observing the metal structure of the plating layer.

Each plated steel sheet was inclined at an angle of 10° to the horizontal plane, and surface ground. Ti—Al base intermetallic compounds present in an [Al phase], a [Zn$_2$Mg phase] and a [Zn phase] were subsequently observed with an EPMA. Moreover, as to Ti—Al base intermetallic compounds present in an [Al phase], the presence or absence of the Ti—Al base intermetallic compounds in a Zn—Al eutectoid structure in which a precipitated [Zn phase] was condensed was observed with an EPMA. Furthermore, whether a Ti—Al base intermetallic compound contained Si or not was observed by observing a Ti—Al base intermetallic compound with an EPMA.

The adhesion of the plating layer was evaluated by the following procedure. An adhesive cellophane tape was affixed to each hot-dip galvanized steel sheet subsequent to a Du Pont impact test, and the tape was peeled off the steel sheet. The adhesion was evaluated by the following criteria:

○: the plating layer is not exfoliated;

Δ: the plating layer is exfoliated in an area of less than 10%; and

X: the plating layer is exfoliated in an area of at least 10%. In the Du Pont test, an impact mold having a roundness of ½ inch at the tip was used, and the test was carried out by dropping a 1-kg weight from a height of 1 m.

The corrosion resistance of each plated steel sheet subsequent to working was evaluated by the following procedure. A sample was subjected to 1 T bending (bending a sample to be tested at an angle of 180° while the sample was being held). The bent portion of the sample was subjected to SST for 1,000 hours. The rust formation state on the bent portion was judged according to the following scores. A steel sheet having a score of at least 3 was accepted.

5: rust formation area of less than 5%;

4: rust formation area of from at least 5% to less than 10%;

3: rust formation area of from at least 10% to less than 20%;

2: rust formation area of from at least 20% to less than 30%: and

1: rust formation area of at least 30%.

Table 2 shows the evaluation results. Because the addition amounts of Al and Si in Sample No. 2 were outside the scope of the present invention, Sample No. 2 was rejected because of the adhesion. The other samples each showed good adhesion of the plating layer and good corrosion resistance after working. Plated steel sheets that had a plating layer containing Si showed particularly good adhesion and corrosion resistance after working.

TABLE 2

| Sample No. | Composition of hot-dip Zn plating layer (mass %) | | | | Metal structure | | | | | Ti—Al base intermetallic cpd. |
|---|---|---|---|---|---|---|---|---|---|---|
| | Mg | Al | Si | Ti | $Mg_2Si$ Phase | Ternary eutectic | Al phase | Zn phase | $MgZn_2$ phase | |
| 1 | 3 | 12 | 0.2 | 0.009 | ○ | ○ | ○ | | ○ | $Ti(Al_{0.85}Si_{0.15})_3$ |
| 2 | 3 | 12 | 0 | 0.009 | | ○ | ○ | | ○ | $TiAl_3$ |
| 3 | 3 | 6 | 0 | 0.01 | | ○ | ○ | | ○ | $TiAl_3$ |
| 4 | 3 | 6 | 0.002 | 0.01 | ○ | ○ | ○ | | ○ | $Ti(Al_{0.95}Si_{0.15})_3$ |

| Sample No. | Site where Ti—Al base intermetallic compound in Al phase was present | Adhesion | Corrosion resistance after working | Note |
|---|---|---|---|---|
| 1 | In Zn—Al eutectoid structure where Zn phase was condensed | ○ | 5 | Ex. |
| 2 | In Zn—Al eutectoid structure where Zn phase was condensed | X | 3 | Comp. Ex. |
| 3 | In Zn—Al eutectoid structure where Zn phase was condensed | Δ | 4 | Ex. |
| 4 | In Zn—Al eutectoid structure where Zn phase was condensed | ○ | 5 | Ex. |

INDUSTRIAL APPLICABILITY

As explained above, according to the present invention, highly corrosion-resistant plated steel products that show excellent surface smoothness and formability, without forming protrusions and recesses in the surfaces even when the solidification rate of the plating layers was small, can be produced.

The invention claimed is:

1. A process for producing a highly corrosion-resistant hot-dip galvanized steel product excellent in surface smoothness and formability, said process comprising:
   providing a plating bath for hot-dip galvanizing;
   adding a Ti—Zn base intermetallic compound consisting essentially of a powder of the Ti—Zn base intermetallic compound to said plating bath;
   hot-dip galvanizing a steel product in said plating bath having said Ti—Zn base intermetallic compound added thereto;
   said hot-dip galvanizing providing a plating layer on a surface of said steel product, said plating layer comprising 4 to 22% by mass of Al, 1 to 5% by mass of Mg, up to 0.1% by mass of Ti, up to 0.5% by mass of Si and a balance of Zn and unavoidable impurities;
   providing said plating layer with a metal structure in which a $Mg_2Si$ phase, an Al phase and a $Zn_2Mg$ phase are present in a mixture in a matrix of an $Al/Zn/Zn_2Mg$ ternary eutectic structure, and
   providing said plating layer with a Ti—Al base intermetallic compound in at least one of the Al phase and $Zn_2Mg$ phase.

2. A process for producing a highly corrosion-resistant hot-dip galvanized steel product excellent in surface smoothness and formability, said process comprising:
   providing a plating bath for hot-dip galvanizing;
   adding a Ti—Zn base intermetallic compound consisting essentially of a powder of the Ti—Zn base intermetallic compound to said plating bath;
   hot-dip galvanizing a steel product in said plating bath having said Ti—Zn base intermetallic compound added thereto;
   said hot-dip galvanizing providing a plating layer on a surface of said steel product, said plating layer comprising 4 to 22% by mass of Al, 1 to 5% by mass of Mg, up to 0.1% by mass of Ti, up to 0.5% by mass of Si and a balance of Zn and unavoidable impurities;
   providing said plating layer with a metal structure in which a $Mg_2Si$ phase, an Al phase, a $Zn_2Mg$ phase and a Zn phase are present in a mixture in a matrix of an $Al/Zn/Zn_2Mg$ ternary eutectic structure, and
   providing said plating layer with a Ti—Al base intermetallic compound in one or at least two of the Al phase, $Zn_2Mg$ phase, and Zn phase.

3. A process for producing a highly corrosion-resistant hot-dip galvanized steel product excellent in surface smoothness and formability, said process comprising:
   providing a plating bath for hot-dip galvanizing;
   adding a Ti—Zn base intermetallic compound consisting essentially of a powder of the Ti—Zn base intermetallic compound to said plating bath;
   hot-dip galvanizing a steel product in said plating bath having said Ti—Zn base intermetallic compound added thereto;
   said hot-dip galvanizing providing a plating layer on a surface of said steel product, said plating layer comprising 4 to 22% by mass of Al, 1 to 5% by mass of Mg, up to 0.1% by mass of Ti, up to 0.5% by mass of Si and a balance of Zn and unavoidable impurities;
   providing said plating layer with a metal structure in which a $Mg_2Si$ phase, an Al phase, and a Zn phase are present in a mixture in a matrix of an $Al/Zn/Zn_2Mg$ ternary eutectic structure, and providing said plating layer with a Ti—Al base intermetallic compound in one or two of the Al phase and Zn phase.

4. A process for producing a highly corrosion-resistant hot-dip galvanized steel product excellent in surface smoothness and formability, said process comprising:

providing a plating bath for hot-dip galvanizing;

adding a Ti—Zn base intermetallic compound consisting essentially of a powder of the Ti—Zn base intermetallic compound to said plating bath;

hot-dip galvanizing a steel product in said plating bath having said Ti—Zn base intermetallic compound added thereto;

said hot-dip galvanizing providing a plating layer on a surface of said steel product, said plating layer comprising 4 to 10% by mass of Al, 1 to 5% by mass of Mg, up to 0.1% by mass of Ti and a balance of Zn and unavoidable impurities;

providing said plating layer with a metal structure in which one or at least two of an Al phase, a $Zn_2Mg$ phase and a Zn phase are present in a mixture in a matrix of an Al/Zn/$Zn_2Mg$ ternary eutectic structure, and providing said plating layer with a Ti—Al base intermetallic compound in one or at least two of the Al phase, $Zn_2Mg$ phase and Zn phase.

5. A process for producing a highly corrosion-resistant hot-dip galvanized steel product excellent in surface smoothness and formability according to any one of claims 1 to 4, wherein the Ti—Al base intermetallic compound is $TiAl_3$.

6. A process for producing a highly corrosion-resistant hot-dip galvanized steel product excellent in surface smoothness and formability according to any one of claims 1 to 4, wherein the Ti—Al base intermetallic compound is Ti $(Al_{1-x}Si_x)_3$, wherein X=0 to 0.5.

7. A process for producing a highly corrosion-resistant hot-dip galvanized steel product excellent in surface smoothness and formability according to any one of claims 1 to 4, wherein the Ti—Al base intermetallic compound contained in an Al phase in the plating layer is present in a Zn—Al eutectoid reaction structure in which Zn phases are condensed.

8. A process for producing a highly corrosion-resistant hot-dip galvanized steel product excellent in surface smoothness and formability according to any one of claims 1 to 4, wherein the size of a dendrite in an Al phase in the plating layer is up to 500 μm.

* * * * *